Aug. 14, 1928.
F. W. ANDERSON
1,680,492
RAILWAY MOTOR TRUCK
Filed Sept. 9, 1926   4 Sheets-Sheet 1
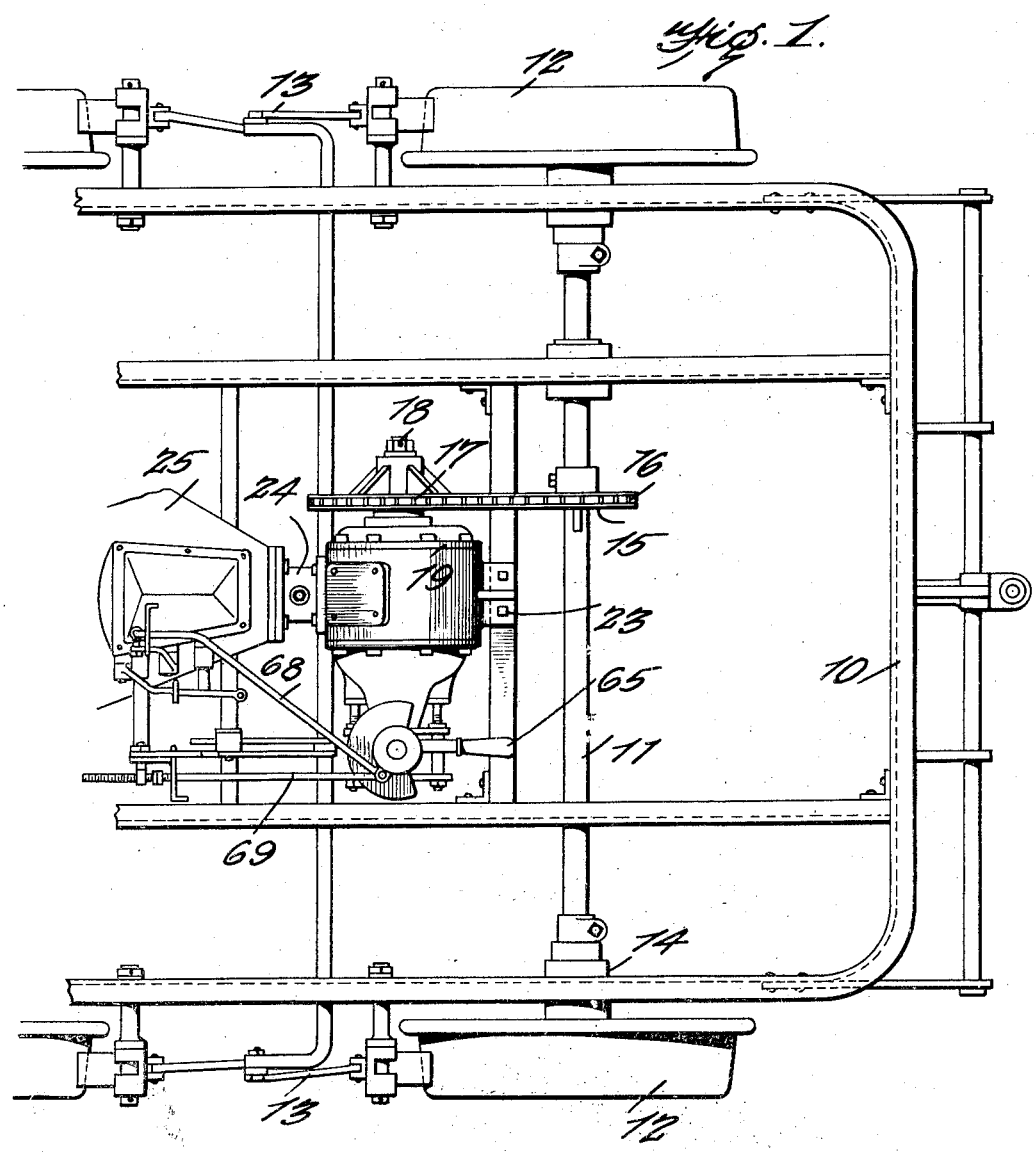
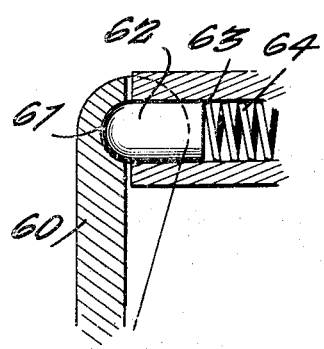
Inventor
Fridtjof W. Anderson
By Thanks Adleman
Attorney

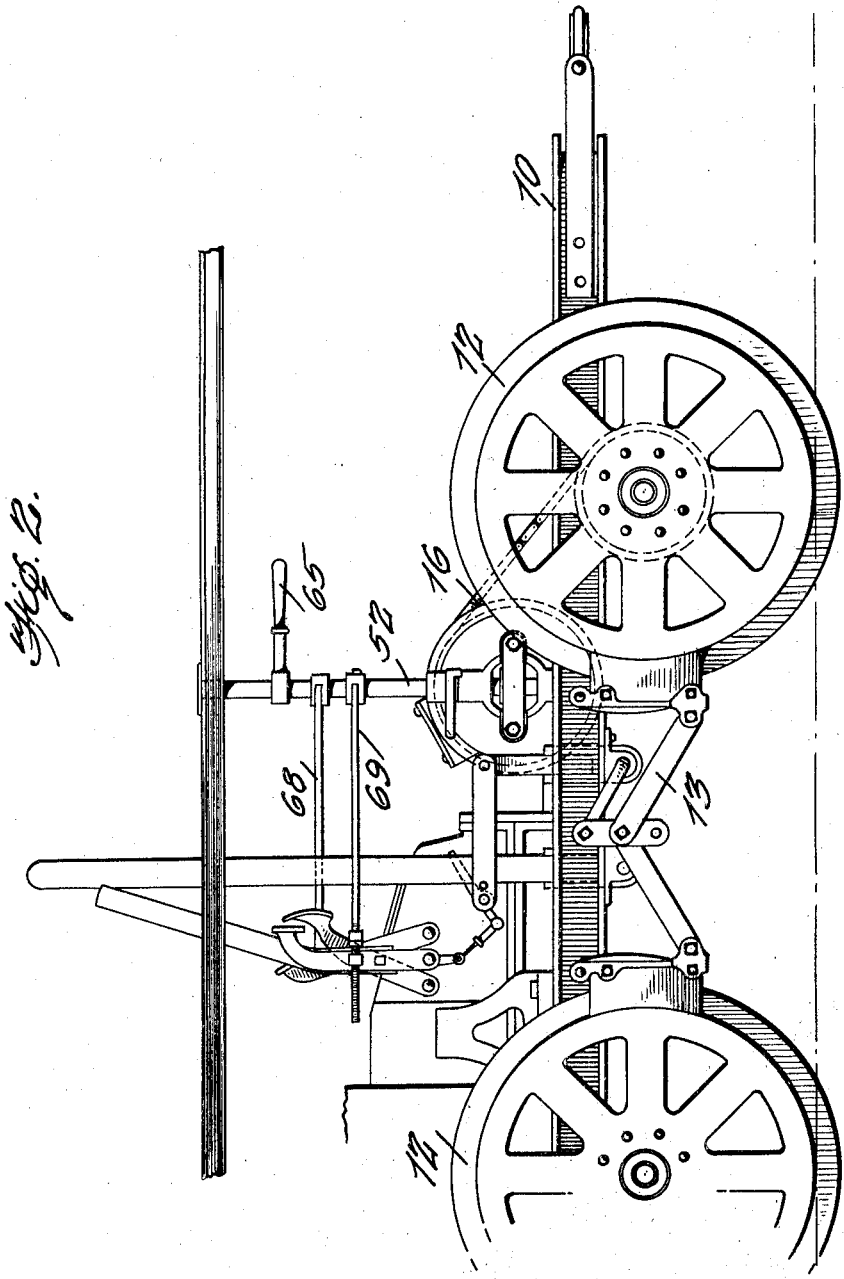

Aug. 14, 1928.
F. W. ANDERSON
1,680,492
RAILWAY MOTOR TRUCK
Filed Sept. 9, 1926   4 Sheets-Sheet 3
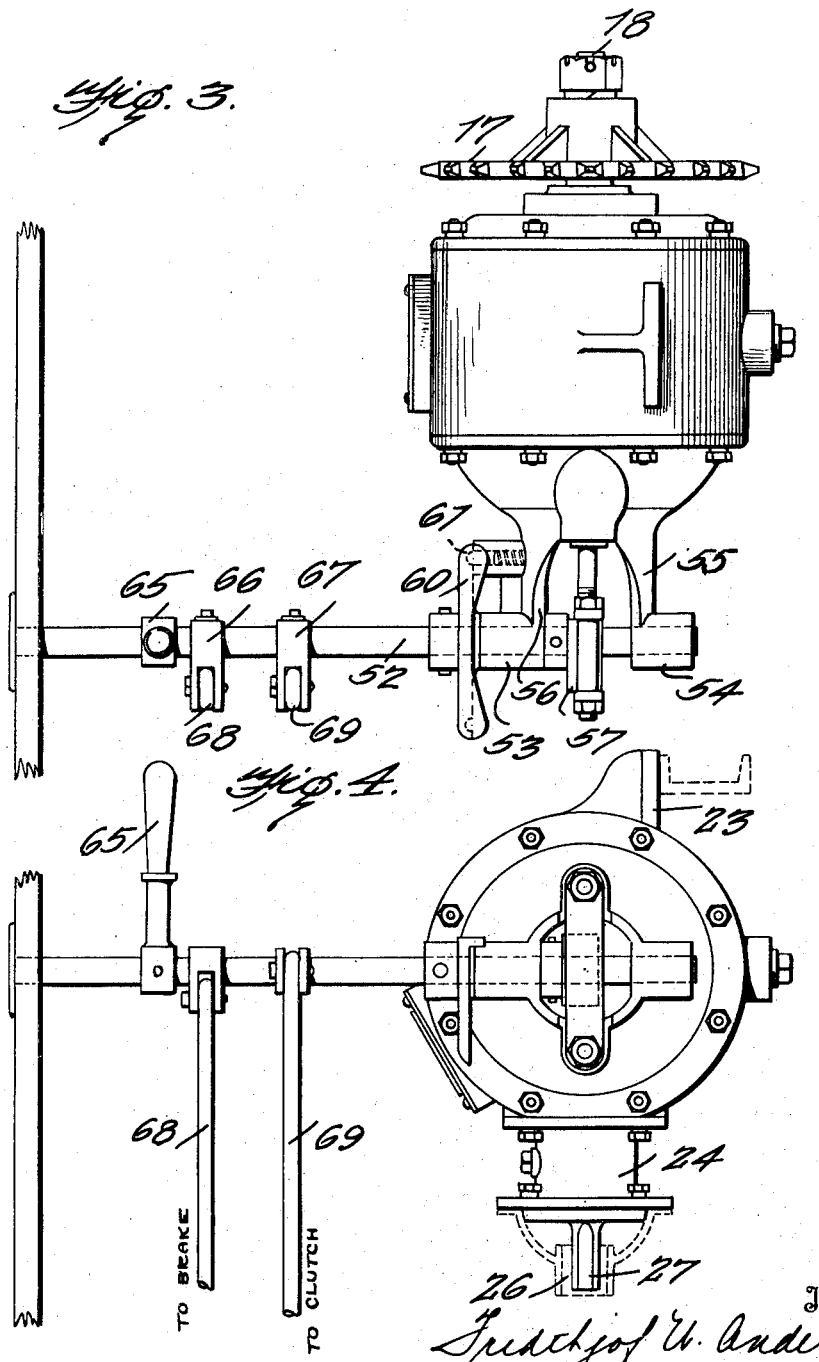

Aug. 14, 1928.
F. W. ANDERSON
1,680,492
RAILWAY MOTOR TRUCK
Filed Sept. 9, 1926
4 Sheets-Sheet 4
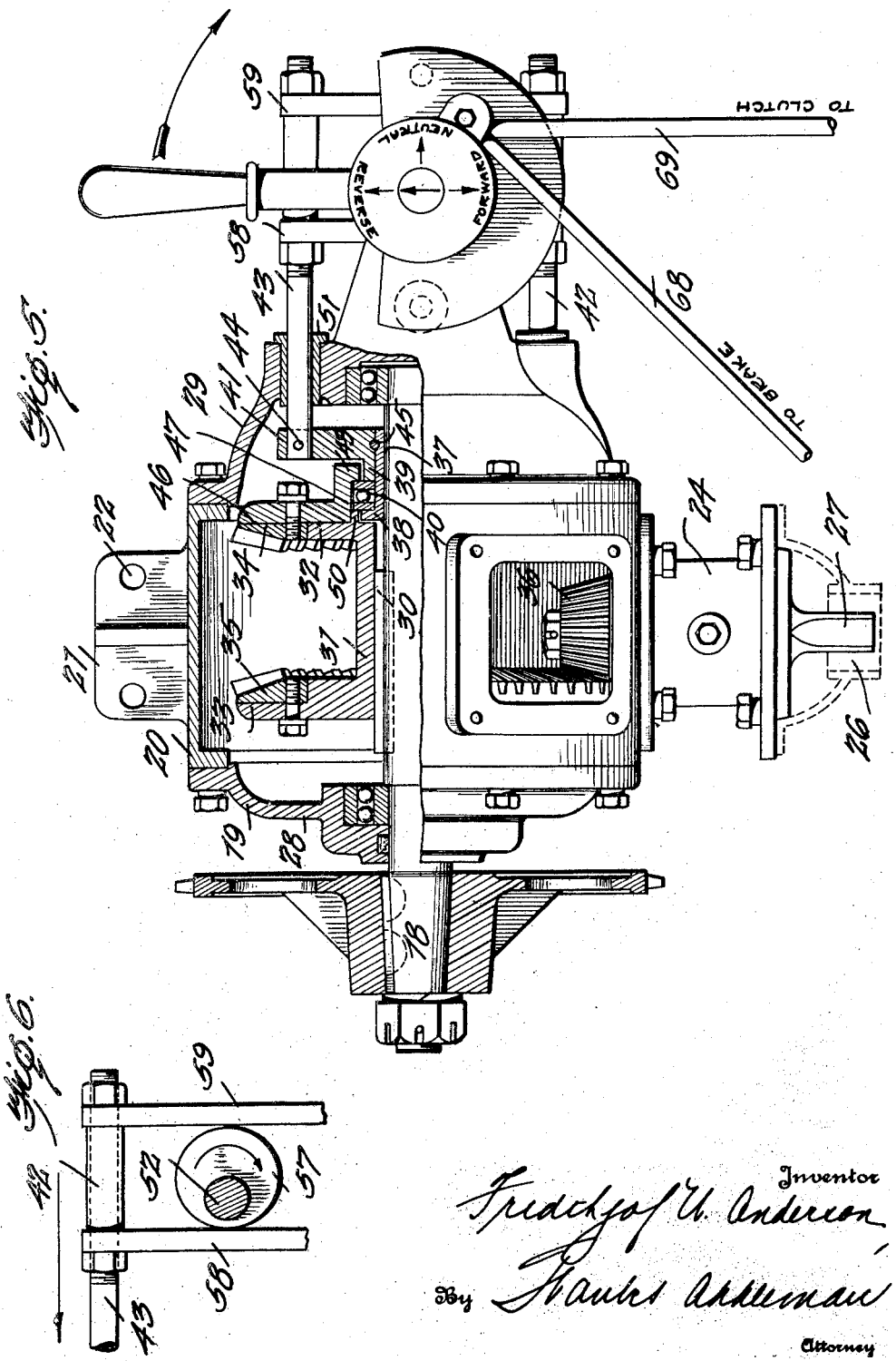

Patented Aug. 14, 1928.

1,680,492

UNITED STATES PATENT OFFICE.

FRIDTHJOF W. ANDERSON, OF EAU CLAIRE, WISCONSIN, ASSIGNOR TO NORTH-WESTERN MOTOR COMPANY, OF EAU CLAIRE, WISCONSIN, A CORPORATION OF WISCONSIN.

RAILWAY MOTOR TRUCK.

Application filed September 9, 1926. Serial No. 134,461.

This invention relates to railway motor trucks or cars, and has particular reference to what are known as section cars used by railway employees for transporting materials and workmen to and from sections of the railway where work is to be done on the roadbed or track; and it is an object of this invention to provide novel means whereby a tractor engine of a well known type may be employed as a power plant for a truck or car.

It is a further object of this invention to provide novel means whereby power from the engine is transmitted to the running gear, axle or the like, of the car; novel means being provided whereby the engine power is transmitted to drive the car forward or reverse while the engine is running, and the usual transmission of the tractor engine is set at the forward drive, thus making it possible to propel the car forward or rearward at the same speed. It is obvious that it would be impracticable to couple the drive shaft from an engine of this kind directly from the transmission shaft to the running gear of the car, for in such instance, the rearward drive would be too slow for the purpose of such installation. In the present invention, the reverse gearing of the transmission need not be employed, since the inventor has provided means of a novel character for transmitting the power to the running gear of the car for accomplishing the result of driving the car forward or rearward in the manner stated.

It is a still further object of this invention to provide a shifting mechanism operative to control a clutch and a brake, the same being actuated simultaneously with gearing arranged in operative relation to a driven shaft and the drive to the running gear of the car, through which instrumentalities power is transmitted from the drive shaft to the running gear.

It is a still further object of this invention to provide novel power transmitting instrumentalities and mountings therefore interposed between the drive shaft and the running gear.

The term "running gear" as used herein is a comprehensive term meant to include a rotatable axle or wheels running on a stationary axle or spindle or any equipment for supporting the car frame and provided with traction wheels to which power is imparted mediately or immediately for turning said traction wheels.

It is a still further object of this invention to provide a power instrumentality of the general character indicated comprising comparatively few inexpensive parts capable of economical maintenance.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a part of the car showing a fragment of a well known transmission casing and elements for operating a transmission in combination with an installation embodying the invention;

Figure 2 illustrates a view in side elevation thereof;

Figure 3 illustrates a view of the mechanism detached from the frame;

Figure 4 illustrates a similar view in a position at right angles to that shown in Fig. 3;

Figure 5 illustrates an enlarged sectional view of the casing and power transmitting instrumentalities, and a control therefor in plan;

Figure 6 illustrates a sectional view of part of the device with the gear shifting cam and yoke in elevation; and Figure 7 illustrates a detail view in section of the control detent.

In these drawings, 10 denotes a car frame, 11 an axle, 12 the wheels, 13 braking mechanism which are conventionally shown, but as the details of their construction form no part of the present invention, they need not be further described.

In the present embodiment of the invention, the car driving mechanism is shown applied to an axle such as 11 that is rotatably mounted in appropriate bearings 14, and a wheel 15 is secured on the axle to rotate with it. The wheel here shown is of the sprocket type and it is engaged by a sprocket chain 16 driven from a sprocket wheel 17 on a shaft 18 and the shaft 18 is appropriately journaled in a housing or casing 19.

In the present embodiment of the invention, the housing ring or drum 20 is secured to the frame structure by a lug 21 apertured as at 22 to receive fastenings 23 such as bolts, and the front of the housing has a bearing 24 connecting it to the transmission housing 25 of the tractor engine, to which reference has been made, it being understood that a drive shaft 26 from the transmission rotates the shaft 27 which is journaled in the bearing 24, and the shaft 27 extends through the bearing and into the housing 19. The housing, in the present embodiment of the invention, is enclosed by heads or plates 28 and 29 having bearings in which the shaft 18 is rotatable, and the said shaft has a feather or key 30 on which a gear wheel 31 is splined so that the gear wheel is movable axially in the shaft and is rotatable therewith. In forming the gear wheel, it is produced with annular flanges 32 and 33 that are spaced from each other and the flange 33 has a ring gear 35 secured to it. An annular plate 46 is secured to the flange 32 and a ring gear 34 is secured to the said annular plate. A pinion 36 is secured on the shaft 27 and its diameter is less than the distance between the ring gears so that there is a clearance between the ring gears constituting a neutral zone which may be occupied by the pinion.

A sleeve 37 is slidable on the shaft 18 and it has an outwardly extending flange 38 at its inner edge. A ring 39 encircles the sleeve and it has an inner edge spaced from the flange 38 and in the space between the flange and the inner edge of the ring a bearing 40 is located. The ring has an annular flange 41 extending radially with relation to the shaft 18, and shifting rods 42 and 43 are connected to the flange, each being secured by the employment of a pin 44. As both of the rods 42 and 43 are secured in the same manner, the showing of the means for securing one of them as in Fig. 5 will suffice, it is thought. The ring 39 and the sleeve are secured together by a pin 45. As before stated, the annular plate 46 is secured on the outer face of the flange 32 and it is provided with a central aperture 47 to receive the shaft and mechanism, as shown in Fig. 5, the said plate 46 having an outwardly extending flange at the edge of the aperture, which flange terminates in a shoulder 49 that extends toward the shaft 18. A portion of the bearing 40 is located between the shoulder 49 and a rib or flange 50 which is preferably integral with the flange 32.

By the assembly and relation of parts just described, the ring gears are shifted axially of the shaft through the thrust or movement of the rods 42 and 43 and therefore the ring gears may be moved to a neutral position with the pinion between them, or either may be moved into engagement with the said pinion. It is the purpose of the inventor that the pinion should be driven in one direction by the engine at all times, and the shifting of the ring gears will serve to reverse the direction of travel of the car, as those skilled in the art will understand. The rods 42 and 43 are slidable in bearings such as 51 located in the head 29 of the gear casing.

As a means for shifting the ring gears and for controlling the clutch of the transmission of the well known type of tractor engine referred to, a shaft 52 is rotatably mounted in preferably vertical position in bearings 53 and 54 formed on arms 55 and 56 that are preferably integral with the head or plate 29 of the gear case 19. A cam 57 is mounted to rotate with the shaft 52 and it operates between the arms 55 and 56. Bearing plates 58 and 59 are mounted on the rods 42 and 43 in spaced relation to each other and the structure forms what might be termed a "yoke" in which the cam 57 operates. As the shaft 52 is rotated or partially rotated, the cam will act on either of the plates 58 and 59 to project or retract the rods 42 and 43, thus moving the ring gears with relation to the pinion to accomplish the purposes heretofore stated. A detent is provided for retaining the shaft 52 in adjusted positions, and as a means for accomplishing this result, a segmental plate 60 is secured on the shaft and it has recesses or seats such as 61 formed therein at oppositely disposed locations. A latch or detent 62 operates in a guide 63 and is urged outwardly by a spring 64 in order that it will ride on the plate or enter one of the slots 61 when said slot is brought into alinement with the detent, so that by this means the shaft is held when the gearing is set for driving the car in a forward or reverse position.

A hand lever 65 is secured on the shaft and the shaft may be rotated through its use. Arms 66 and 67 are also secured on the shaft 52 and links 68 and 69 are pivotally connected to the arms, respectively. The link 68 extends to and is connected to a brake operating lever or instrumentality of the tractor engine, and the link 69 is operatively connected to the clutch lever pedal or instrumentality of the said engine, and in order that there may be certainty as to the sufficiency of the disclosure, applicant wishes it to be understood that the engine employed and the installations so far made have been those commonly used in the Fordson tractor, and the link 68 is to be connected to the brake pedal of a Fordson tractor and this in turn stops the drive pinion of the transmission of said tractor from revolving, preventing clashing of gears when the shifting operation occurs, whereas the link 69 is to be connected to the clutch pedal of said Fordson tractor, although obviously the connection between the link 68 and the brake and the connection between the link 69 and the clutch may be changed to suit particular requirements and in association with changed constructions of engines of this or the same general type. The shifting operation, as in the present embodiment of the invention, is accomplished through the movement of the lever 65 covering a radius of 180° in a forward drive while it is in one position and a reverse drive at the extreme adjustment in the reverse direction. The braking operation to which reference has been made occurs at the 90° radius and works equally as well in shifting in either direction.

As the operation of the several parts of the mechanisms, has been stated in connection with the description of the mechanisms and their relations to one another, further detail description of the operation is believed unnecessary for an understanding of the invention by one skilled in the art.

I claim:

1. In a motor car, a truck having traction wheels, an engine on the truck having driving and reversing gear transmission, a drive shaft rotated through the transmission, a housing into which the drive shaft extends and in which it is rotatable, a shaft rotatable in the housing, means for transmitting power from the second mentioned shaft to the traction wheels, means for controlling the direction of rotation imparted to the traction wheels from the second mentioned shaft, clutch controlled mechanism for the transmission, brake operating means associated with the engine, means for operating the clutch, means for operating the brake, means for shifting the direction controlling means, and a manually operated control whereby the clutch, the brake and the direction controlling means are operated simultaneously.

2. In a motor car, a truck having traction wheels, an engine on the truck having gear transmission, a drive shaft rotated through the transmission, a housing into which the drive shaft extends and in which it is rotatable, a shaft rotatable in the housing approximately at right angles to the axis of the drive shaft, power transmitting means on the second mentioned shaft, means for controlling the direction of the driving, means for transmitting power from the second mentioned shaft to the traction wheels, clutch controlled mechanism for the transmission, brake operating means associated with the engine, means for operating the clutch, means for operating the brake, means for shifting the drive control, a manually operated control whereby the clutch, the brake and the drive control are operated simultaneously, and means for holding the manually operated control at different positions of adjustment.

3. In a motor car, a truck having traction wheels, an engine thereon having a transmission, a brake for the truck, a drive shaft operated by the transmission, a bearing located on the truck in which the drive shaft is rotatable, a pinion on the drive shaft, ring gears mounted for operation at diametrically opposite locations with respect to the pinion and spaced apart a distance greater than the diameter of the pinion, a shaft on which the ring gears are splined, shifting mechanism for the ring gears slidable on the shaft and operative to move the ring gears into engagement with the pinion selectively, means for transmitting the power of the second mentioned shaft to the traction wheels, a clutch control for the engine, and means for simultaneously shifting the ring gears and the clutch control.

4. In a motor car, a truck having traction wheels, an engine thereon having a transmission, a brake for the truck, a drive shaft operated by the transmission, a bearing located on the truck in which the drive shaft is rotatable, a pinion on the drive shaft, ring gears mounted for operation at diametrically opposite locations with respect to the pinion and spaced apart a distance greater than the diameter of the pinion, a shaft on which the ring gears are splined, shifting mechanism for the ring gears slidable on the shaft and operative to move the ring gears into engagement with the pinion selectively, means for transmitting the power of the second mentioned shaft to the traction wheels, a clutch control for the transmission, a brake control associated with the engine, and means for simultaneously shifting the ring gears, the clutch and the brake control.

5. In a motor car, an engine mounted on a truck, a drive shaft operated by the engine, a housing in which the drive shaft is journaled, a shaft journaled in the housing with its axis at right angles to the axis of the drive shaft, a gear wheel splined on the second mentioned shaft, said gear wheel having flanges in spaced relation to each other, ring gears carried by opposed flanges, a pinion on the shaft between the ring gears and of less diameter than the space between the ring gears, a sleeve slidable on the second mentioned shaft, means for communicating motion of the sleeve to the gear wheel, arms mounted for reciprocation through the one wall of the casing, means for connecting the rods to the sleeve whereby movement of the rods is imparted to the sleeve, and means for projecting and retracting the rods.

6. In a motor car, an engine mounted on a truck, a drive shaft operated by the engine, a housing in which the drive shaft is journaled, a shaft journaled in the housing with its axis at right angles to the axis of the drive shaft, a gear wheel splined on the second mentioned shaft, said gear wheel having flanges in spaced relation to each other, ring gears carried by the flanges, a pinion on the shaft between the ring gears and of less diameter than the space between the ring gears, a sleeve slidable on the second mentioned shaft, means for communicating motion of the sleeve to the gear wheel, arms mounted for reciprocation through the one wall of the casing, means for connecting the rods to the sleeve whereby movement of the rods is imparted to the sleeve, plates extending from one rod to the other in spaced relation to each other, a shaft rotatably mounted between the plates, a cam on the shaft engaging the plates, and means for rotating the shaft for moving the rods inwardly and outwardly.

FRIDTHJOF W. ANDERSON.